United States Patent [19]

Espinoza et al.

[11] Patent Number: 5,193,042

[45] Date of Patent: Mar. 9, 1993

[54] AUTOMATIC ENERGIZING DAMPING DEVICE

[75] Inventors: Carlos A. Espinoza; Jose Velazquez, both of Edomex, Mexico

[73] Assignee: Dielpromex S.A. de C.V., Tacubaya, Mexico

[21] Appl. No.: 624,360

[22] Filed: Dec. 7, 1990

[51] Int. Cl.⁵ ............................................. H02H 3/20
[52] U.S. Cl. .................................... 361/79; 361/83; 361/91; 361/93
[58] Field of Search ..................... 361/88, 89, 90, 91, 361/92, 93, 94, 85, 86, 87, 80, 79

[56] References Cited

U.S. PATENT DOCUMENTS

| | | | |
|---|---|---|---|
| 4,068,277 | 1/1978 | Simokat | 361/55 |
| 4,139,878 | 2/1979 | Shuey | 361/93 |
| 4,470,091 | 9/1984 | Sun et al. | 361/86 |
| 4,686,383 | 8/1987 | Croft | 307/200 |
| 4,833,628 | 5/1989 | Curran Jr. | 361/85 |
| 4,947,281 | 8/1990 | Boteler | 361/56 |
| 4,965,692 | 10/1990 | Burns et al. | 361/18 |

Primary Examiner—Sharon D. Logan
Assistant Examiner—C. Schultz
Attorney, Agent, or Firm—Jacobson, Price, Holman & Stern

[57] ABSTRACT

An electronic automatic energizing damping device for connection to a source of electrical energy to protect and safeguard continuously all the devices, instruments, equipment and systems, connected to the source. The device comprises a control stage and a power stage. The control stage monitors the operating conditions of both the A.C. line and the load energized by it via the power stage, in order to detect irregularities in any of the programmed parameters of the voltage or the current, and supplies control signals that regulate the power stage. The power stage supplies the energy of the network to the load, according to the commands of the control stage. The control stage features a voltage sensor circuit, a current sensing circuit, a comparison circuit to receive the output of the voltage sensor circuit and an energy relay control circuit. The power stage comprises a surge breaker and suppressor, and an optical interface circuit. An alternating current detector circuit and a zero detector circuit connect the power stage to the control stage.

6 Claims, 1 Drawing Sheet

AUTOMATIC ENERGIZING DAMPING DEVICE

FIELD OF THE INVENTION

The present invention relates to an electronic automatic energizing damping device which is connected to an electric power supply network to protect and safeguard continuously all the devices, instruments, equipment and systems, as well as the electric power supply network, by means of the following two basic function stages: I) a control stage which monitors the operating conditions of both the A.C. line and the load energized by it via the power stage, in order to detect irregularities in any of the programmed parameters of the voltage or the current and automatically acts to protect the load, the electric power supply network and itself, by supplying control signals that regulate the power stage; and II) a power stage which supplies the energy of the electric power supply network to the load, according to the commands of the control stage.

BACKGROUND OF THE INVENTION

Voltage regulators and line management instruments, and surge suppressors are basically the most important electronic devices used to protect the equipment operated with alternative current.

The operating principle of voltage regulators and line conditioners are used to protect equipment using a high amount of electric energy and, as a result, the projection provided is very limited because their slow response to transient surges, capacity of the energy to be managed and the restricted range of the operating voltages. Moreover, this equipment delivers instant electric energy, that is, without any delay or damping, and requires both constant monitoring by the user and continuous maintenance for its correct operation.

On the other hand, the surge suppressors can limit the wide amplitude variations generated by the electrical facilities only within a certain range, since their impedance changes according to the voltage detected between their terminals. This means that the transient peaks are suppressed as a result of a temporary short circuit between the said terminals, without affecting or altering the low voltages encountered beyond the normal range or triggering the poor functioning, including the breakdown and overheating of the equipment operated in these conditions.

As a result of this situation, the protection provided by devices of this nature is very limited, in addition to presenting a series of other shortcomings such as high weight, large volume and high cost. Moreover, since in critical operating conditions they act as highly reactive loads, without delaying or damping the load of the network, these devices may induce serious disorders in the installed network.

These and other shortcomings and limitations are widely and advantageously corrected by the device claimed by the present invention.

SUMMARY OF THE INVENTION

The present invention relates to a delayed-action automatic electronic energizing damper (AED) for alternating current which is connected to the tap of electric energy supplied by the public electric power supply network, after the meter (wattmeter) and the central switch with protecting fuses, in the electrical equipment that must be protected.

The AED checks the existence of electric energy at the entry terminals and verifies that the voltage supplied by the network is within a predetermined range, for example from about 95 volts to about 135 volts.

In the absence of alternating current, or if the latter exceeds the programmed range, the device automatically cuts off the delivery of power to the electric installation in question.

Upon the resumption of the alternating current, provided that the latter is stable for a certain period of time, preferably 5 seconds, AED automatically and slowly energizes the connected load and dampens it. In other words, it supplies gradually, in approximately 1 second, from 0% to 99% of the energy resulting from the first stable cycles and the next ones, without any detectable change in the supply of electric energy.

AED is designed such that, when connected to the public network of alternating current, it performs the following basic functions:

1) Continuous protection of all the devices, electrical equipment, equipment and systems operated with electric power supplied by the public network against transient surges of power generated during the resumption of the power supply following a cut or blackout in normal operating conditions. Moreover, it filters and attenuates the surges produced by atmospheric discharges, such as lightning, preventing the operation of the equipment in poor power supply conditions. Likewise, it is provided with a current sensing and limiting circuit which protects the installations against instant continuous overloads and continuous short circuits, automatically reestablishing the power following the cessation of the abnormal voltage or overcharge conditions.

2) Protects the public electric power supply network by damping the load applied to the network when the supply of current is resumed after a power failure, as well as any instability occurring during delivery. By preventing power surges or sudden overloads, it improves the operating conditions of the public power supply network, which results in the reduction of maintenance costs. It is also useful in reducing the size and electrical specifications of the distribution substations, in that it is no longer necessary to provide for excess design capacity which is usually required to withstand the overload generated when the network is energized.

Accordingly, the primary object of the present invention is to provide an automatic energizing damper which, when connected to the tap of electric power, provides total protection and safeguards with respect to everything connected before it (the public network), and after it (particular installation or user).

Another object of the present invention is to provide an automatic energizing damper which provides continuous protection within a wide range of voltage, both low and high.

Another object of the present invention is to provide an automatic energizing damper which energizes automatically the load, according to a gradual and dampening pattern, which reduces the maintenance costs of the equipment being protected.

Still another object of the present invention is to provide an automatic energizing damper that protects the equipment of the public power supply distribution network, in that it dampens and prevents the generation of surges in the network, and also filters and prevents the reflection of surges generated by atmospheric discharges.

Another object of the present invention is to provide an automatic energizing damper that generates digital control signals (TTL) for the relay in the supply of energy across the power generating plants.

Still another object of the present invention is to provide an automatic energizing damper the principle of which is applicable to various demands of electric energy, by selecting adequately the power stage according to the specific needs and also applicable to any type of equipment operated by alternating electrical current.

Another object of the present invention is to provide an automatic energizing damper of low energy consumption, without a load at its exit (approximately 6 Watts) and highly efficient at full load (approximately 98.8%), which provides protection at practically no operating cost.

An additional object of the present invention is to provide an automatic energizing damper which is also a system of protection against overload and acts when the limits established in the control circuit are exceeded or in continuous short circuit conditions.

Still another object of the present invention is to provide an automatic energizing damper compatible with various frequencies of the network by synchronizing automatically to the required frequency, in the range from 20 to 1000 Hz.

These and other objects of the present invention emerge more clearly from the detailed description of the invention, which is presented below.

DETAILED DESCRIPTION OF THE INVENTION

Figure 1:
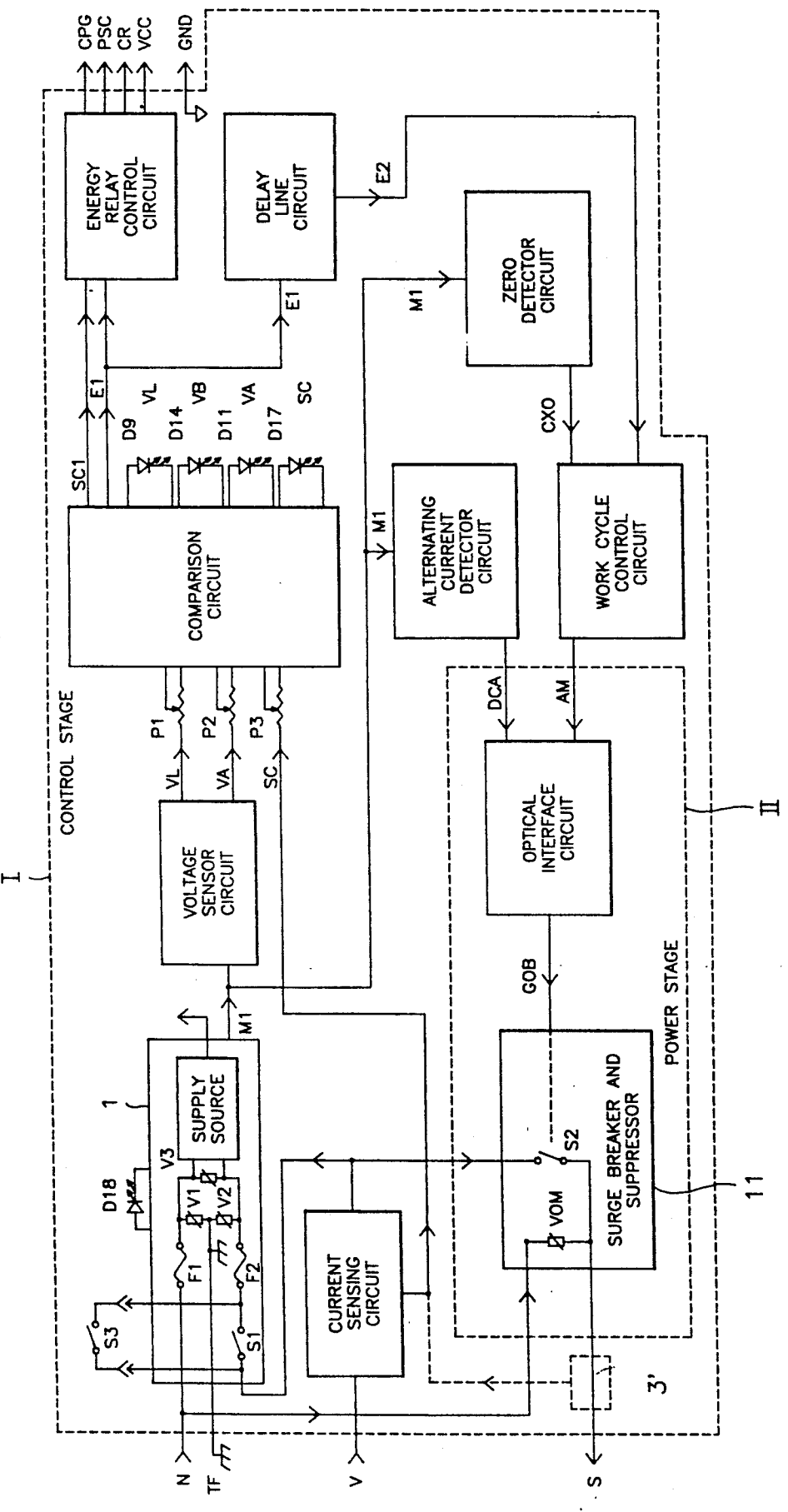
FIG. 1 is a block diagram which illustrates the components of the automatic energizing damper according to the present invention.

The automatic energizing damper claimed by the present invention is characterized by the following two basic stages: I) a control stage and; II) a power stage.

The function of the control stage, which is the brain of the AED, is to monitor the operating conditions of both the AC line and the load energized by the power stage. When it detects any abnormal changes in programmed voltage or current parameters, it acts automatically to protect the load, the electric power supply network that supplies the electric energy and the device itself, by generating the command signals which control the power stage.

The power stage is responsible for the delivery of the load of energy received from the network, according to the commands of the control stage. In turn, each of the two basic stages of the AED device consists of a series of electronic circuits and elements which together and in combination account for the development of the overall function of the said device.

* The control stage consists of the following elements and circuits:
an electronic power supply source circuit 1;
a voltage sensing circuit 2;
a current sensing circuit 3;
a comparison circuit 4;
an energy relay control circuit (TTL) 5;
a delay line circuit 6, that activates the solid state switch of the power stage;
a zero crossing detector circuit 7;
an alternating current detector circuit 8; and
a duty cycle control circuit 9 for controlling the duty cycle of the solid state switch. The power stage consists of the following electronic circuits:
an optical interface 10; and
solid state switch circuit and surge suppressor means 11.

In FIG. 1, the electronic power supply source 1 converts the energy of the alternating current received from the public network to a direct current of lower intensity, which supplies the control circuits of the AED, for its adequate operation. The feeding voltage to the circuits of the AED is indicated by +B. It also generates the proportional sampling signal M1 for sensing the amplitude and frequency of the operating voltage. This circuit also provides sufficient protection against the overvoltage and surges in the network to the control stage and to the power stage, as well as the power and load connected to AED. This is made possible by the protection network formed by varistors V1, V2 and V3 and fuses F1 and F2. Breaker S1 energizes the control stage and acts as a control master. The remote control of AED is achieved by means of a remote breaker S3.

When the operating voltage limits of AED is exceeded, or in the presence of surges of voltage from any of the three supply lines, live, V, neutral, N, and physical ground TF, an excessively high current flow through fuses F1 and/or F2, passing across V1, V2 or V3 and inducing the break of F1 and/or F2 much earlier than the break of the varistors. This results in the cut-off of the energy supply at the source and prevents the breakdown or malfunctioning of AED.

An indicator D18, such as a light-emitting diode, visually indicates to the user the condition of the open or molten fuses for their replacement. After replacing the fuses, AED is once more reactivated.

The cut-off of energizing in the control stage automatically triggers the operation of the damper and opens the solid state electronic switch S2 to allow the passage of the alternating current to the load, with subsequent de-energizing and protection.

It is important to point out that before the disabling effect resulting from operating beyond the operating range, in the form of fuse failure, for example, AED blocks the flow of energy to the load by detecting the high voltage conditions prevailing in the comparison circuit 4, thus providing timely and early protection to everything connected to it.

The voltage sensor circuit 2 receives the proportional signal M1 originating from the supply source and adapts it for transmission to the comparison circuit 4.

The adaption operation involves: a) limitation of the amplitude, so that it does not exceed the limits tolerated by the comparison circuit 4, thus protecting the control stage and assuring its adequate operation in critical conditions resulting from the presence of surges in the network; b) average out its amplitude, in order to prevent fluctuations and instability in the control stage, as compared to the references provided by the comparison circuit 4; c) delay the signal to be compared, in order to prevent false manifestations in the comparison circuit 4 in normal operating conditions, during the insertion of a surge of tolerable amplitude, thus assuring that the comparison circuit 4 is sensitive enough and providing a stable and adequate energy service, compatible with the standards; and d) divide the signal M1 to obtain two identical signals which are fed to the comparison circuit 4 through the pre-adjusted potentiometers P1 and P2, in order to achieve its adequate calibration in the comparison circuit 4 and to establish the range of the discharge of the comparison circuit 4 against the voltage variations on the line.

The current sensing circuit 3 detects the flow of current across the live feeding line V of AED and converts it to a proportional signal equal to 1/1000 smaller than the said current. This proportional current is converted to a voltage and is adequate for subsequent use as the overload signal SC in the comparison circuit 4 across the pre-adjustable potentiometer P3 for the calibration of the level that determines the overload condition, thus controlling the limitation of the current and protecting the AED.

The adaptation of the proportional current signal to the load involves the following steps: a) conversion of the sample current to a reflection voltage proportional to it, known as overload or SC current; b) rectification of the SC current to allow comparison; c) limit the SC signal, in order to prevent damage to the comparators of the comparison circuit 4 as a result of the great variation in its amplitude when it senses an excessive transient surge of current generated by atmospheric discharges, reactive loads or even a short circuit; d) averaging out of the SC signal to prevent oscillations and instability in the control stage, as compared to the reference values of the comparison circuit 4; e) delaying the SC signal to prevent the false discharge of the comparison circuit upon the appearance of power loads when leaving the previously energized AED, as it happens with the startup of induction motors or lighting networks.

These adjustments guarantee the continuous supply of the current, as well as reliable and accurate protection against overloads and continuous short circuits when leaving the AED.

It is important to note that, as indicated by reference 3' in FIG. 1, when the AED has several outlets and a more accurate control is required, independently of the current limitations prevailing at each outlet, the current can also be sensed when it leaves the device. This is one of the multiple combinations that can be implemented to comply with the particular requirements of each user.

Comparison circuit 4 confirms that the levels of the high voltage signal, VA, low voltage signal, VL, and overload signal, SC, are adequate. This is achieved by comparing a portion of these signals against a common reference. When any of these signals presents an alteration, the comparison circuit 4 generates an error signal E1 which flags the presence of an undesirable condition by means of low, D9, high, D11, and overload, D17, indicators.

Signal E1 triggers the cut-off of the energy at the solid state switch 52 of circuit 11, after being delayed by the delay line circuit 6, being transformed into E2 signal. The E2 signal will activate the duty cycle control circuit 9 in order to generate a command signal which controls the duty cycle of the power stage. Also, the duty cycle control circuit 9 is synchronized to the operating frequency of the electric power supply network through the CXO signal from the zero crossing detector circuit 7.

The low voltage, VL, high voltage, VA, and overload, SC, signals enter the comparison circuit 4 and calibrate the discharge levels of the error Signal E1 across the pre-adjusted potentiometers P1, P2 and P3.

The comparison circuit 4 also supplies the overload signal SC1 for consideration by the energy relay control circuit (TTL) 5, thus preventing the startup of an emergency plant in conditions of short circuit in the load. Each of the comparators in the comparison circuit 4 responds independently. The high voltage comparator can be calibrated to generate the fail signals preferably at 135 V.A.C. R.C.M. (Volts of Alternating Current, Average Square Root) and cancels it by lowering the voltage to 130 V.A.C. R.C.M., which implies a hysteresis of 5 V.A.C. R.C.M. in the alternating supply voltage. The low voltage comparator can be calibrated to generate the failure signal preferably at 95 V.A.C. R.C.M. to cancel it when exposed to a voltage of 102 V.A.C. R.C.M., which implies a hysteresis of 7 V.A.C. R.C.M.

The overload comparator acts when the nominal capacity of the current applicable to AED is exceeded by 30% and is reestablished automatically upon the cut-off of the flow, when the comparison circuit 4 is activated.

The hysteresis of the comparators in circuit 4 prevents the occurrence of fluctuations and instabilities in AED when the voltage conditions of the network are unstable, when the demand of power during the operation varies. It is important to note that all the calibration levels of the voltages and currents can be adjusted according to the specific needs and applications of the final user.

The circuit that controls the relay of power (TTL) 5 is the interface between AED and an electric power generating plant (not shown). Its function is to synchronize the startup of the emergency power generating plant with the AED and the public network, across a power relief circuit (not shown). This power development control circuit (TTL) receives the E1 and SC1 signals.

Signal SC1 is generated at the time of the detection of an overload condition, which results in the suppression of the flux of current across AED and the subsequent resumption of normal operating conditions, such that the overload condition lasts only a few fractions of a second.

Signal SC1 is delivered to the emergency plant instantly, in order to prevent its startup and operation in conditions of overload.

The power relay control circuit (TTL) 5 generates the following signals at its outlets: a) a CPG signal, the continuous control signal for the startup of the emergency plant; b) a PSC signal, the instant TTL pulse which indicates the presence of an abnormal overload condition, in order to prevent the operation of the emergency plant in these conditions; c) a CR signal, which is a TTL control signal for the energy relay (not shown) that commands the transfer of the sources between the public network and the emergency plant; d) a VVC signal, small source of direct current, delayed and stabilized to assist in the control of the energy reliever (not shown) and prevent the flow of current between the contacts of the reliever (not shown) during the said transfer. This guarantees the long life of the relay circuit (not shown), with minimum maintenance of its contacts and optimal transfer of the services; and e) a GND signal, which is a grounding point for direct current common to all the TTL control circuits with the same reference.

The delay line circuit 6 that activates the switch of the power stage delays the arrival of the E1 signal to the duty cycle control circuit 9 to about 5 seconds. The new delayed signal is E2.

This delay allows sufficient time for the electronic power supply source 1 and the rest of the circuits to stabilize before sending any instructions to the power stage, when the electric power arrives at the intake of AED after a cut-off.

In addition to the 5 second delay, energizing the load also results in the stabilization of the voltage in the network, thus preventing the application of transient surges to the load due to the decline of the power stage. p This circuit 6 does not induce a substantial delay in the delay line power cut-off control of the load, which protects instantaneously against any of the abnormal operating conditions.

The zero crossing detector circuit 7 guarantees the switching of the solid state switch S2 to the power stage, synchronizing the frequency of the supply voltage at the exact time when the amplitude of the alternating current is equal to zero. This minimizes the noise generated on the supply line by the commands directed to the solid state switch S2 when the power management is "zero" and assures better operation of AED and the least possible wear of the solid state switches.

The reference for the zero crossing detector circuit 7 is provided by the M1 signal which generates a synchronized TTL pulse level (zero point for CXO) at the very moment when the value of signal M1 is zero volts. Since signal M1 is in phase at twice the frequency of the supply line, the pulse of the "zero point" is an accurate reference for the command of the power stage, solid state switch S2 switching at each half-cycle of the alternating supply current.

The alternating current detector circuit 8 senses or detects the existence of electric power at the entrance of AED across signal M1 and detects immediately (in about 1 second) the supply of direct current to the optical interface circuit 10 as soon as it detects the presence of the alternating supply current. This prevents the false discharge of the power stage at the start of AED energizing. At this time, the instant surges on their way to the load at this moment are filtered once more across the solid state switch S2.

The duty cycle control circuit 9 of the solid state switch S2 generates the dampened signal AM used to command the power stage. Upon receiving the error signal E2, circuit 9 synchronizes the slow and dampened startup of the power stage, according to the reference supplied by the zero crossing detectors circuit 7, such that the AM signal generated at its exit (TTL signal having a frequency twice as high as the power supply frequency of AED) varies its duty cycle from 100% to 1% and forwards it to the optical coupler or optical interface circuit 10 to control the reverse behavior of the duty cycle of the solid state switch S2, which ranges from 0% to 99%, in approximately 1 second. This happens as determined by signal E2, or following the initialization of the energizing process following a cut-off or discontinuation of the power to the load due to the detection of one or more conditions of failure.

This semi-slow and gradual energizing of the power stage gives the damping effect of the load to the electric power supply network at any request of current and prevents the generation of damaging transient surges caused by instant overloads during the initialization of the supply of current to the load. As a result, protection is obtained for the circuits compatible with the load, the public distribution network and the AED itself.

In continuation and with reference to FIG. 1, the optical interface circuit 10 is a high voltage optical coupling isolation circuit which connects the two stages (control II and power II) and isolates the TTL signals generated in the control state by the command of the solid stage switch S2, to provide polarization and sufficient protection to the said solid state switch S2 against reactive loads across a "Snubber" circuit.

The presence of the optical coupling circuit 10 prevents the occurrence of undesirable noise and interference generated by the loads in the power stage and reflected to the control stage, insulating electrically both stages.

The optical interface circuit 10 receives the AM signals originating from the duty cycle control circuit 9 and the DCA supply voltage originating from the alternating current detector circuit and generates 8, the GOB command signal which controls the solid state switch S2.

The components of the solid state switch and surge suppressor 11 are the solid state switch S2 and a metal oxide varistor, VOM. The solid state switch S2 allows the passage of the current towards the load, or not, depending on the orders received from the control stage, which are delivered across the optical interface circuit 10.

Varistor VOM limits the transient surges produced by reactive charges, preventing their reflection to the supply network, and, therefore, protecting the load, AED and source of power.

The power capacity managed by the said circuit 11 depends on the particular power requirements of the user.

The load is connected to the output line S of the power stage in order to receive the electric energy from the electric power supply network.

The electronic, delayed-action automatic energizing damper, or AED, for alternating current, consists essentially of the circuit described herein; the said circuits, together and in combination perform the following general operation:

When AED is energized for the first time, there is a delay of 5 seconds before the flow of alternating current is allowed to pass across it. During this period of time, the device senses the voltage supplied by the electric power supply network, such as the public supply network, for example, and keeps it within the range of the calibrated voltages (nominal calibration, depending on the specific application), allows the passage of the current to the load and, in about 1 second, supplies 0% to 99% of the power of the first stable cycles, without evidence of overload or voltage variations beyond the said range, in which case the delivery of the current to the load is discontinued and the initialization process is repeated after the lapse of stabilization period of 5 seconds.

This process is repeated automatically every time that the failure conditions are present, whether there is a question of overload or voltage variations beyond the predetermined range.

Although the present invention was described with reference to the circuit mentioned and a series of preferred embodiments, it is understood that qualified technical personnel can figure out other practical embodiments are necessarily compatible with the extent and spirit of the present invention which is limited only by the attached claims.

We claim:

1. An automatic electronic, delayed-action energizing damper capable of connection to an electric power supply network of alternating current having voltage and current parameters and to which a load is connected, the damper comprising:

an electronic power supply means for providing electric energy to the circuitry of the energizing damper;

voltage sensing means connected to said electronic power supply means for sensing the voltage parameter of the electric power supply network;

current sensing means for sensing the current flow across the energizing damper to the load;

comparator means for comparing signals supplied by the current and voltage sensing means with reference values;

energy relay control means for generating operation control signals;

delay line means for delaying startup signals to the duty cycle control means;

zero crossing detector means for detecting when a signal output from the electronic power supply source means is zero providing an output signal in response thereto, and which signal is a multiple of the frequency of the electric power supply network synchronizing thus the operating frequency of the energizing damper;

alternating current detector means for detecting the presence of electric energy incoming to the energizing damper from the electric power supply network;

duty cycle control means responsive to the output signal of said zero crossing detector means and to the startup signal of said delay line means for generating a command signal an optical interface circuit responsive to the output signal of the alternating current detector means and a command signal from the said duty cycle control means for generating a commuting command signal;

a solid state electronic switch means responsive to the commuting command signal for commuting the power to the load; and surge suppressor means for limiting the amplitude of surge voltages across the energizing damper.

2. The automatic electronic delayed-action energizing damper according to claim 1, wherein the said comparator means is calibrated to generate signals indicative of faulty voltages and/or currents within a wide voltage and/or current range, according to the specific application of particular requirements of a user.

3. The automatic electronic delayed-action energizing damper according to claim 1, wherein said current sensing means detects the flow of current across the supply line.

4. The automatic electronic delayed-action energizing damper according to claim 1, and further comprising a plurality of output lines and wherein said current sensing means detects the flow of current across each output line.

5. The automatic electronic delayed-action energizing damper according to claim 3, wherein the operating frequency of said damper is synchronized automatically to the frequency of the electric power supply network.

6. The automatic electronic delayed-action energizing damper according to claim 1, wherein said electronic power supply means is provided with a remote master control switch for the remote control of said automatic energizing damper.

* * * * *